United States Patent [19]

McGee

[11] 4,289,157
[45] Sep. 15, 1981

[54] VALVE WITH HEAT-RESPONSIVE BEARING ASSEMBLY PROVIDING BACK SEAT ARRANGEMENT

[75] Inventor: John K. McGee, Houston, Tex.

[73] Assignee: Combustion Engineering, Inc., Windsor, Conn.

[21] Appl. No.: 79,953

[22] Filed: Sep. 28, 1979

[51] Int. Cl.³ .................. F16K 41/02; F16K 17/38
[52] U.S. Cl. .................................. 137/72; 251/214; 251/267; 251/330; 277/26
[58] Field of Search .................. 137/72, 73, 74, 75, 137/315; 251/267, 268, 269, 266, 214, 330, 326, 327, 328, 329; 277/26

[56] References Cited

U.S. PATENT DOCUMENTS

| | | | |
|---|---|---|---|
| 2,780,233 | 2/1957 | Volpin | 137/315 |
| 3,349,789 | 10/1967 | Crain et al. | 251/214 |
| 3,788,600 | 1/1974 | Allen | 251/214 |
| 3,789,875 | 2/1974 | McGee | 251/63.6 |
| 3,838,705 | 10/1974 | Diehl et al. | 137/72 |
| 3,842,853 | 10/1974 | Kelly et al. | 137/75 |
| 3,896,835 | 7/1975 | Wicke | 137/72 |
| 4,125,060 | 11/1978 | McGee et al. | 92/59 |
| 4,138,091 | 2/1979 | McGee | 251/267 |
| 4,149,558 | 4/1979 | McGee et al. | 251/214 |
| 4,214,600 | 7/1978 | Williams, Jr. et al. | 251/330 |

*Primary Examiner*—Martin P. Schwadron
*Assistant Examiner*—G. L. Walton
*Attorney, Agent, or Firm*—Cushman, Darby & Cushman

[57] ABSTRACT

The bearing assembly of a normally non-rising stem gate valve is provided with an annulus of fusible material. Upon subjection to a preselected temperature level, the fusible body melts out of the way, permitting the stem to raise slightly, making up a metal-to-metal seal between the valve stem and bonnet. This forms another line of defense against consequences from loss of the sealing normally provided by the valve stem packing.

3 Claims, 2 Drawing Figures

VALVE WITH HEAT-RESPONSIVE BEARING ASSEMBLY PROVIDING BACK SEAT ARRANGEMENT

BACKGROUND OF THE INVENTION

Gate valves, such as the one shown in Crain et al, U.S. Pat. No. 3,349,789, issued Oct. 31, 1967 often and necessarily are provided with seals and packing that works well, lasts long and maintains its integrity under ordinary circumstances, but which is subject to being damaged should there be a fire the heat of which engulfs the valve for more than a short period of time. Accordingly, proposals have been made for providing such valves with a second line of defense, which comes into play only if a fire or the like should threaten to or actually destroys the integrity of the usual seals and packing. A typical environment where such a precaution is worthwhile taking is where the valve is to be used to control the egress of subterranean fluids (i.e. as part of a petroleum well completion). Other typical environments for use are petroleum refineries, petrochemical complexes, and chemical manufacturing, processing, storage, handling, transportation and use facilities.

According to some prior art proposals, the valve is provided with one or more fusible bodies which, when in place, keep the back seat elements apart. Upon subjection of the valve to sufficient heat, the fusible body or bodies flow out, permitting some crucial shifting of the valve components that cause a metal back seat seal to be made up, providing a measure of additional safety.

What the present invention provides is a convenient way to provide the fusible body or bodies on valves of the type described and for similar apparatus.

SUMMARY OF THE INVENTION

The bearing assembly of a normally non-rising stem gate valve is provided with an annulus of fusible material. Upon subjection to a preselected temperature level, the fusible body melts out of the way, permitting the stem to raise slightly, making up a metal-to-metal seal between the valve stem and bonnet. This forms another line of defense against consequences from loss of the sealing normally provided by the valve stem packing.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
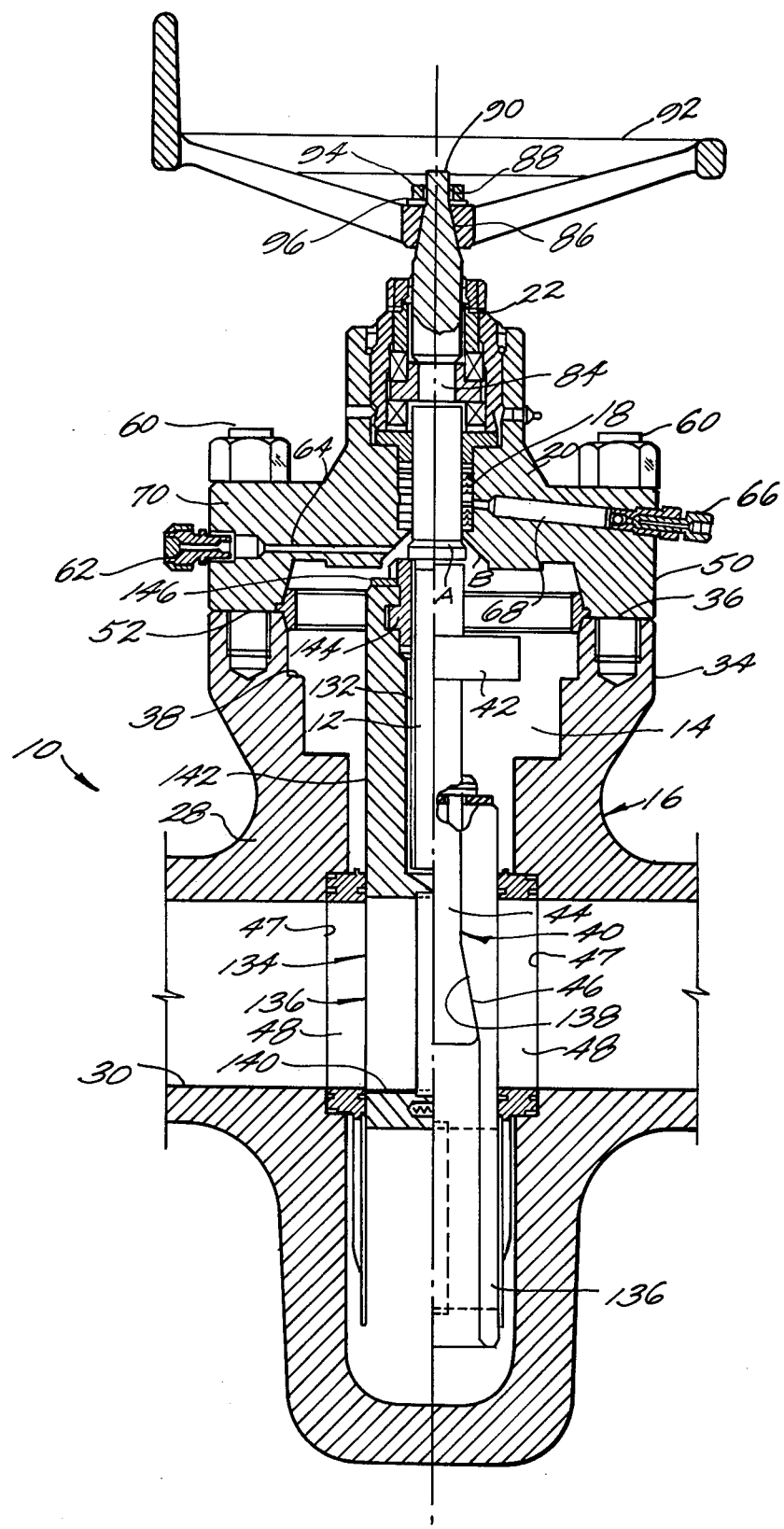
FIG. 1 is a fragmentary longitudinal sectional view of a gate valve provided with a heat responsive back seat arrangement in accordance with principles of the present invention. (The portions of the valve housing broken off at the opposite ends of the throughbore are conventional, e.g. flanged ends, e.g. as shown in the aforementioned prior U.S. patent of Crain et al.).
Figure 2:
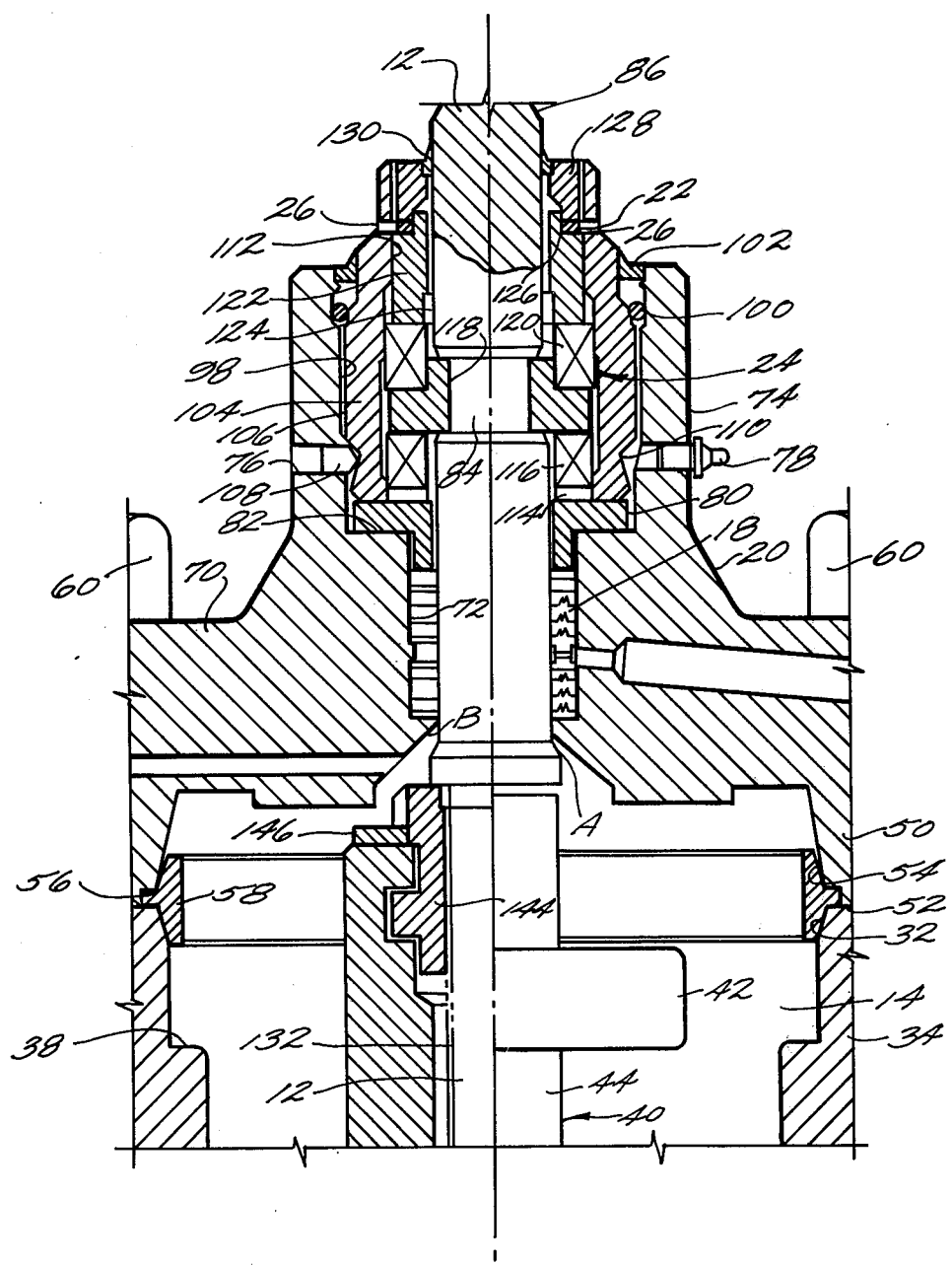
FIG. 2 is an enlarged fragmentary detail of FIG. 1.

FIGS. 1 and 2 each show the center line of the valve 10 that coincides with the valve stem axis. To the left of the center line the valve is shown in a normal "open" condition and to the right of the center line the valve is shown in a normal "closed" condition.

Normally, this is a non-rising stem valve and the main seal about the valve stem 12 between the chamber 14 and the external environment where the valve stem 12 penetrates the valve housing 16 is conventionally provided by packing 18 about the stem 12 within the bonnet 20 of the housing 16.

However, should there be a fire in the vicinity of the valve 10 or great heat likely to destroy or severely damage the packing 18, the valve 10 has a safety feature which comes into play, as follows. A ring 22 of fusible material that is incorporated in the valve stem bearing assembly 24 melts and flows out of position through the holes 26. Pressure from within the valve then will raise the gate assembly slight, until a metal-to-metal back seat seal is formed by circumferential abutment of the coaxially annular surface A on the valve stem with coaxially annular surface B on the bonnet 20.

A simple construction is shown, e.g. a manually operated valve with no provision for automatically opening the valve if it is closed nor for automatically closing the valve if it is open. However, it should be understood that many of the principles will apply to like valves provided with automatic operators, e.g. such as the one described in the aforementioned prior U.S. patent of McGee et al.

Some more details of what is shown in the drawings will now be given in case the reader is unfamiliar with the sort of valve that is shown.

The valve housing 16 includes a main body 28 with a horizontal throughbore 30 (in the orientation shown in the drawings) with a chamber 14 that intersects the throughbore vertically crosswise. The chamber 14 intersects the exterior of the main body 28 at a site intermediate the ends of the main body. There, the wall of the chamber 14 is provided with a sealing surface 32 and the main body is provided with a tubular portion 34 with an outer end surface 36.

Below the sealing surface 32, the wall of the chamber 14 is coaxially provided with an axially outwardly facing ledge 38 (i.e. which faces in the same direction as the end surface 36 faces). A unitary, wedge-type gate expander 40 hangs into the chamber 14 in the body 28 from this ledge 38. The expander 40 includes an annular base 42 at its upper end. This base 42 rests on the ledge 38. At two diametrically opposed sites, the base 42 is provided with legs 44 which integrally depend therefrom and have gate expanding wedge surfaces 46 formed thereon near the lower ends thereof.

Where the valve throughbore 30 is intersected by the chamber 14, the throughbore 30 is circumferentially enlarged and each resulting recess 47 receives a sealing ring 48.

The valve 10 further includes a bonnet 20 which matches the valve body tubular part 34 by having a similar tubular part 50 with an end surface 52, and internally having an annular sealing surface 54. In addition, a circumferential notch 56 is formed where the bonnet end surface 52 intersects the chamber 14 in the bonnet.

The valve bonnet is sealed and secured to the valve body by installing an opposed lip, externally circumferentially flanged sealing ring 58 between the two parts to form a circumferential seal at 32 and 54, with the sealing ring rib being received in the notch 56; a ring of bolts 60 is installed through the bonnet tubular part 50 into the valve body tubular part 34.

The valve bonnet 20 is shown including a normally closed bleeder plug 62 installed in a passageway 64 that leads to the upper reaches of the chamber 14. The valve bonnet 20 also is shown including a normally closed fitting 66 at the external end of a passageway 68 leading to the stem packing 18, so that conventional plastic compounds for energizing and/or normally renewing the stem packing may be injected under pressure.

Centrally of its outer end wall 70, the bonnet has a throughbore 72. The sealing surface B is provided circumferentially of the intersection of the bonnet throughbore 72 with the valve chamber 14, in the upper reaches of the valve chamber 14. A ways above the sealing surface B, the bore 72 is twice enlarged, once to provide the recess in which the packing 18 is received, and above that to provide for the elements which keep the packing in place, keep the valve gate assembly in place, and journal the valve stem for rotation. The region of the second enlargement and above can be thought of as an outer tubular extension 74 of the valve bonnet 20. The sidewall of the extension 74 is shown provided with a radial, internally threaded opening 76 and a grease fitting 78.

Typically, the packing 18 will be a stack of several washer-like elements, some of which are retainers for the opposite ends of the stack, and others being annuluses of somewhat resilient and/or plastic material and still others being configured to admit pressurizing sealant fed in through the fitting 66. A packing gland 80 is shown following the assembly of packing 18 and bottoming on the internal shoulder 82 at the base of the tubular extension 74.

Where the stem 12 passes through the packing 18 and gland 80, it is of constant radius. A ways above the base of the tubular extension 74, the stem 12 has a band 84 that is of smaller diameter. Above that the stem is of its aforesaid constant radius again, until after reaching the exterior of the valve, the stem 12 is provided with keying and threaded portions 86, 88 at its end 90. An operating hand wheel 92 is shown mounted on the end 90, being keyed thereto at 86 and secured thereon through the use of a nut 94. Item 96 is the usual washer.

Above the set screw opening 76 and the grease fitting 78 the bore 72 of the bonnet extension 74 is internally threaded at 98 and provided with surfaces for accommodating a bonnet gland retainer wire 100 and a bonnet rod wiper 102.

A tubular bonnet gland 104 that is externally threaded at 106 is threaded into the bore 72 until it engages the packing gland 80 and a set screw 108 is threaded in through the opening 76 until it engages the packing gland 80 in an external notch 110 in order to prevent the bonnet gland 104 from backing out. The bonnet gland 104 also is provided with surfaces for accommodating the bonnet gland retainer wire 100 and the bonnet rod wiper 102.

It should now be noticed that near its outer end the bonnet gland 104 is internally threaded at 112. The bonnet gland surrounds and houses radially between itself and the stem 12 a number of important parts of the stem bearing assembly 24. Shown, starting from the bottom, are a spring washer 114 which seats on the packing gland 80, a lower, roller bearing 116 for the stem 12, a split collar 118 assembled about the stem into the recess at 84 for interfacing the stem with its bearings, an upper, roller bearing 120 and a tubular spacer 122 with a bearing bushing 124 between it and the stem 12. The radially outer corner of the upper end of the spacer 122 is shown circumferentially relieved to provide a recess 126, radially inwardly backed by a remaining tubular web of the upper end region of the bearing bushing 124. The lower part of this recess 126 receives a washer-like annulus of fusible material 22. An externally threaded tubular retainer gland 128 is screwed into the upper end of the bonnet gland until its nose axially engages the fusible body 22. It should be apparent that this step normally secures the valve stem against rising, while leaving the valve stem free to be rotated by rotation of the handwheel 92.

The retainer gland encircles the stem 12 near the hand wheel and is internally configured at its upper end to accommodate an annular valve stem wiper 130.

Down in the chamber 14, the stem 12 is shown having a lower, externally threaded portion 132. The valve gate 134 includes upstream and downstream plates 136 with wedge follower surfaces 138 at their edges. Each plate 136 has a bore 140 for alignment with the valve body throughbore 30 when the valve is in an open condition and an upper, blind portion 142 which is lowered into blocking relation with the valve body throughbore 30 when the valve is closed.

In order to threadably connect the gate plates to the stem 12 so that when the hand wheel 92 is turned the gate is raised and lowered, the gate plates are assembled at their upper ends about an internally threaded drive bushing 144 that is keyed to the gate plates by a torque plate 146. (See McGee, U.S. Pat. No. 4,138,091, issued Feb. 6, 1979 for more details.)

Should the valve 10 be subjected to such heat that the integrity of the packing 18 and sealing 48 be degraded, the temperature also will be sufficient to destroy the ring 22, by making it so plastic, so runny or so crumbly that it flows out the holes 26 provided in the bonnet gland radially beside its position. Pressure from within the valve, if any fluid is attempting to escape past the damaged seals and packing, then will raise the gate assembly slightly, until a metal-to-metal back seat seal is formed at A, B.

Any material customarily used for fusible, heat-destructed bodies for instance as conventionally used in automatic sprinkling systems may be used. Typical materials are metals containing lead, bismuth, indium and/or cadmiun as principle low temperature-melting alloying constituents. Similarly acting plastic resin materials are commercially available for use in this context.

It should now be apparent that the valve with heat-responsive back seat arrangement as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. For a normally non-rising stem valve having a valve stem which passes out of a chamber in a valve housing through a bonnet having a passageway in which a packing assembly normally seals between the valve stem and the bonnet and in which a bearing assembly journals the valve stem for rotation relative to the bonnet and a retainer means secures the bearing assembly relative to the bonnet against substantial axial movement of said valve stem and of said bearing assembly, the improvement wherein:

the retaining means includes a bonnet gland secured to said bonnet and surrounding the bearing assembly;

the retaining means further includes a retainer secured to the bonnet gland relatively exteriorly of the bearing assembly; and the retaining means further includes a body of relatively low temperature fusible material physically axially interposed between said retainer and the bearing assembly, said body being in the form of a washer-like annulus;

said improvement further comprising channel means out through which said fusible material may run when subjected to a predetermined amount of relatively low temperature heat, so that when the fusible material has run out, the valve stem is free to rise to a limited extent; and said improvement further comprises an annular first metal sealing surface circumferentially provided on said valve stem and a second metal sealing surface provided on said bonnet within said chamber, which two sealing surfaces normally remain spaced axially apart but which become annularly engaged in a sealed condition upon rising of said valve stem by said limited extent;

the bonnet gland comprising a tubular member having an internally threaded outer end portion and said retainer comprising an externally threaded tubular retaining gland threaded into the outer end portion of the bonnet gland;

said valve stem including a radially outwardly projecting flange and said bearing assembly including a first bearing ring below and in contact with that flange and a second bearing ring above and in contact with that flange; and a tubular spacer means interposed between the second bearing ring and the annulus of fusible material.

2. The valve improvement of claim 1, wherein:
said channel means is constituted by at least one passageway through the bonnet gland from the interior thereof to the exterior thereof.

3. The valve improvement of claim 1, wherein:
said valve stem has a valve gate threadably connected therewith within said chamber.

* * * * *